(12) United States Patent
Székely et al.

(10) Patent No.: US 12,122,458 B2
(45) Date of Patent: Oct. 22, 2024

(54) COMPONENT

(71) Applicant: AUDI AG, Ingolstadt (DE)

(72) Inventors: Béla Székely, Györ (HU); Bence Szabó, Osli (HU); Arne Boldt, Ingolstadt (DE)

(73) Assignee: AUDI AG, Ingolstadt (DE)

(*) Notice: Subject to any disclaimer, the term of this patent is extended or adjusted under 35 U.S.C. 154(b) by 785 days.

(21) Appl. No.: 17/255,568

(22) PCT Filed: Jul. 23, 2019

(86) PCT No.: PCT/EP2019/069727
§ 371 (c)(1),
(2) Date: Dec. 23, 2020

(87) PCT Pub. No.: WO2020/020847
PCT Pub. Date: Jan. 30, 2020

(65) Prior Publication Data
US 2021/0293262 A1  Sep. 23, 2021

(30) Foreign Application Priority Data
Jul. 25, 2018 (DE) .................... 10 2018 212 363.2

(51) Int. Cl.
*B62D 27/06* (2006.01)
(52) U.S. Cl.
CPC .................. *B62D 27/065* (2013.01)
(58) Field of Classification Search
CPC ......... B62D 27/065; B62D 25/04; F16B 5/02; F16B 37/04
See application file for complete search history.

(56) References Cited

U.S. PATENT DOCUMENTS

| 4,905,569 A | 3/1990 | Seksaria et al. |
| 7,946,794 B2 | 5/2011 | Pares Isanta |

FOREIGN PATENT DOCUMENTS

| CN | 1212340 A | 3/1999 |
| CN | 1693723 A | 11/2005 |
| CN | 107965502 A | 4/2018 |
| DE | 26 17 254 A1 | 6/1977 |
| DE | 41 38 372 A1 | 6/1992 |
| DE | 195 26 934 A1 | 1/1997 |
| DE | 199 40 970 A1 | 1/2001 |
| DE | 10048279 A1 | 4/2002 |
| DE | 10 2009 032 945 A1 | 1/2011 |

(Continued)

OTHER PUBLICATIONS

Machine Translation of DE 102016220587, worldwide.espacenet.org, generated Nov. 7, 2023 (Year: 2016).*

(Continued)

*Primary Examiner* — Daniel J Wiley
(74) *Attorney, Agent, or Firm* — Maier & Maier, PLLC

(57) ABSTRACT

A component with a support, for which a flat region is defined. The support has a support cover which at least partly has the shape of a cone, a funnel, or a tent and which is raised out of the flat region. One end of the at least partly cone-, funnel-, or tent-shaped support cover, said end facing away from the flat region of the support, is equipped with a recess for mounting a securing element to be secured to the component.

20 Claims, 3 Drawing Sheets

(56) References Cited

FOREIGN PATENT DOCUMENTS

DE  10 2016 220 587 A1  4/2018
EP       2 143 925 A1  1/2010

OTHER PUBLICATIONS

Machine Translation of De 102016220587A1, via espacenet.com, generated Feb. 19, 2024 (Year: 2016).*
Notification of Transmittal of Copies of Translation of the International Preliminary Report on Patentability issued on Feb. 4, 2021, in connection with corresponding International Application No. PCT/EP2019/069727; 7 pages.
Examination Report issued on May 11, 2023, in corresponding European Application No. 19749607.8, 10 pages.
Examination Report issued on Mar. 6, 2019 in corresponding German application No. 10 2018 212 363.2; 10 pages Including Machine-generated English-language translation.
International Search Report issued on Oct. 17, 2019 in corresponding International application No. PCT/EP2019/069727; 6 pages.
Written Opinion of the International Searching Authority issued on Oct. 17, 2019 in corresponding International application No. PCT/EP2019/069727; 9 pages including Machine-generated English-language translation.
Office Action issued on Dec. 23, 2021, in connection with corresponding Chinese Application No. 201980048176.5 (11 pp., including machine-generated English translation).

* cited by examiner

COMPONENT

FIELD

The disclosure relates to a component with a recess for mounting a securing element to be secured to the component.

BACKGROUND

A screw connection may be arranged on the component, in which a recess for a screw on the component is reinforced by means of reinforcement ribs, which absorb and divert mechanical loads, particularly with a highly loaded screw connection.

Publication DE 41 38 372 A1 describes a casting for a vehicle body, in which two master points arranged apart from one another are provided on a casting wall as molded protrusions and/or molded recesses.

Publication DE 199 40 970 A1 describes a device for securing a handle to a cooking or baking dish.

An internal combustion engine with at least two cylinders is known from publication EP 2 143 925 A1. In this case, slugs for implementing screws are arranged on a turbine of the internal combustion engine.

SUMMARY

Against this backdrop, an object was to provide a stable recess for a securing element on a component.

The component according to the invention has a support, for which a flat region and/or a plane is defined, which is part of the support, in which the support has a support cover, in addition to this flat region, which support cover, at least in part or in sections, has the shape of a cone, a funnel, and/or a tent which protrudes from the flat region. In this case, one end of the at least partly cone-, funnel-, or tent-shaped support cover, said end spaced apart from and/or facing away from the flat region of the support, is equipped with a recess for mounting a securing element, which is to be secured or can be secured to the component.

In one potential embodiment, the presented component is formed as a part of a component assembly and/or as a blank and/or semi-finished part of a component assembly or of a workpiece. In this case, it is possible that a workpiece according to the invention and/or a component assembly according to the invention has at least one component according to the invention and thus a support with the particularly cone-shaped, especially funnel-shaped or tent-shaped support cover. It is also possible that the component itself is formed as a component assembly. Furthermore, it is also possible that the support cover may be formed as a protrusion which extends starting from the flat region up to the end with the recess, and, in this case, particularly includes a volume which is not necessarily symmetrical.

The at least partly cone-shaped support cover may, as an alternative or supplement, be formed and/or characterized also as an at least partly funnel-shaped and/or tent-shaped support cover, which protrudes from the flat region or the plane of the support of the component. In this case, it is possible that a base area protrudes from the support cover in order to define the at least partly cone-shaped, funnel-shaped, and/or tent-shaped support cover in the flat region of the support of the component, in which the base area may have an elliptical shape and thus may also be circular in design. Furthermore, the support cover may have a shape of a straight or inclined cone. An axis extending along the at least partly cone-shaped, funnel-shaped, and/or tent-shaped support cover starting from the flat region of the support may be oriented at any angle and thus, for example, at a 90° angle, as relates to the flat region. The fact that the support cover is at least partly cone-shaped, funnel-shaped, and/or tent-shaped means that at least one part of the support cover also has a shape of a cone, of a funnel, and/or of a tent, in which another part of the support cover has a different shape, for example a shape of a flat surface or of a bent surface, in which the support cover is formed cone-shaped, funnel-shaped, and/or tent-shaped in one part and formed in a different shape in another part. It is also possible that the support cover is formed completely cone-shaped, funnel-shaped, and/or tent-shaped.

In this case, it is possible that the at least partly cone-shaped, funnel-shaped, and/or tent-shaped support cover surrounds, encloses, or envelopes an at least partly cone-shaped, funnel-shaped, and/or tent-shaped region and/or space, i.e. an at least partly cone-shaped volume.

In one embodiment, the component has a slug with a body, which is arranged on the end of the at least partly cone-shaped, funnel-shaped, and/or tent-shaped support cover and forms a wall for the recess, in which the securing element can be arranged or is to be arranged in the recess and thus also in the slug, in which an opening of the recess is arranged on the end of the at least partly cone-shaped, funnel-shaped, and/or tent-shaped support cover. In this case, it is possible that the end of the support cover also corresponds to an end of the slug, which are connected to one another at this common end. The recess in the body of the slug may have a cylinder-shaped inner wall and an internal thread for the securing element. A further component can be attached to the described component having the support cover via such a securing element.

Furthermore, it is possible that the at least partly cone-shaped, funnel-shaped, and/or tent-shaped support cover surrounds, encloses, or envelopes the body of the slug at least partly.

Typically, the recess is formed for attaching a securing element, formed as a screw, to the component.

In one embodiment, the component is formed as a cast part, as a forged part or a forged component, as a plastic part or plastic component, or as a cold-extruded part or cold-extruded component.

The component may be formed or provided as a part of a motor vehicle, in which the component can be used as a part of the motor vehicle.

In one potential embodiment, an at least partly cone-shaped, funnel-shaped, and/or tent-shaped threaded slug for a highly loadable screw connection is provided on a component formed, for example, as a cast component, a forged component, a plastic component, or a cold-extruded component with the at least partly cone-shaped, funnel-shaped, and/or tent-shaped support cover, on the end of which the recess for mounting the securing element is arranged, in the event that the securing element is formed, for example, as a screw.

Otherwise, customary reinforcement ribs for a screw connection can be replaced with the at least partly cone-shaped, funnel-shaped, and/or tent-shaped support cover, which also comprises the slug, for example the threaded slug. Typically, reinforcement ribs, provided in accordance with design guidelines, would be oriented in a load direction. It is likewise possible to consider load directions of the securing element by means of corresponding shaping of the at least partly cone-shaped, funnel-shaped, and/or tent-shaped support cover. Until now, a quantity, height, and thickness of the reinforcement directions would be set as a function of a load of a threaded slug. Accordingly, it is now possible to vary, for example, a height of the support cover starting from the flat region and/or a thickness or wall thickness of the support cover as a function of load.

The new design of a threaded slug as a component of the at least partly cone-shaped, funnel-shaped, and/or tent-shaped support cover, which is formed to stabilize the threaded slug, means that the securing element, which is formed for example as a screw, can be more strongly loaded mechanically on the component or the component assembly. Forces from different load directions acting on the securing element attached to the component can be better absorbed and diverted due to the at least partly cone-shaped, funnel-shaped, and/or tent-shaped design of the support cover. In this case, it is possible to eliminate peak mechanical stresses. It is also possible to improve the acoustic properties of the component. By replacing the otherwise typical reinforcement ribs with the support cover, material buildup can be reduced, and, for example, a casting capacity of the component can be improved. A weight savings or weight reduction of about 15% can be achieved due to the geometry and/or design of the support cover for stabilizing the threaded slug. It is further possible to comfortably model the component with the support cover and the recess for mounting the securing element with a CAD program, in which there are greater freedoms in establishing a model for the component. In this case, new options of CAD software can be used, for example as relates to free-form surfaces, whereby time can also be saved.

Particularly for a component formed as a die-cast part, forged part, plastic part, or cold-extruded part, the at least partly cone-shaped, funnel-shaped, and/or tent-shaped design of the support cover is beneficial for stabilizing the slug, because a die-cast alloy has less strength than a gravity-cast alloy, in which such a die-cast part reacts sensitively to material buildup, in which such type of material buildup can now be prevented when producing the component, because otherwise customary reinforcement ribs can now be replaced by the support cover.

It is clear that the previously mentioned and subsequent features to be explained can not only be used in the combinations indicated but also in other combinations or alone without going beyond the scope of the present invention.

BRIEF DESCRIPTION OF THE FIGURES

The invention is schematically shown in the drawings by means of embodiments and is described schematically and extensively with reference to the drawings.

Fique 2b shows a view of a first embodiment of the component according to the invention, in a schematic representation.

Figure 3:
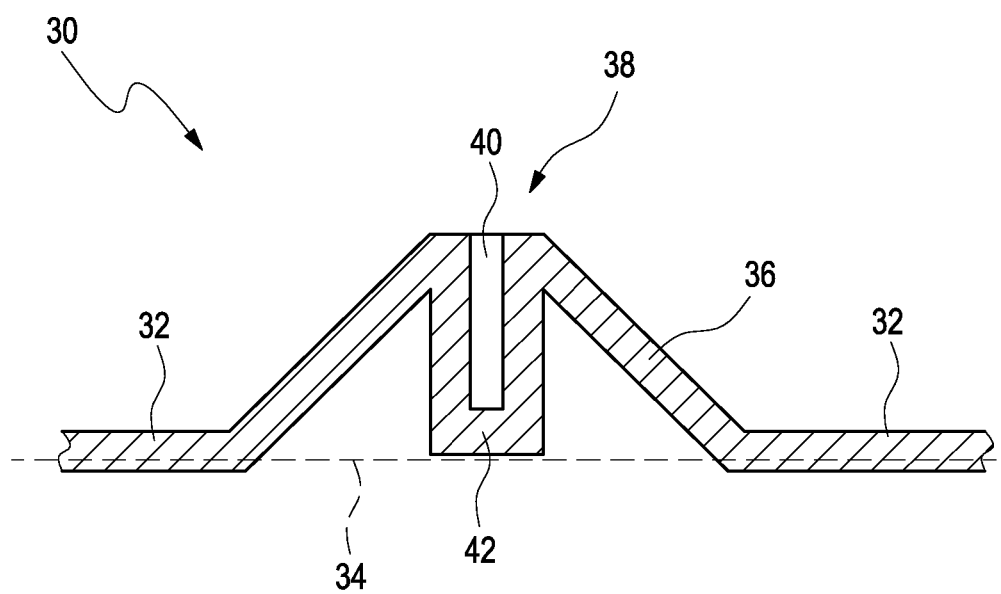

FIG. 3 shows a second embodiment of the component according to the invention, in a schematic representation.

The figures are cohesively and comprehensively described; equivalent reference numerals have been assigned to the same components.

DETAILED DESCRIPTION

Figure 1:
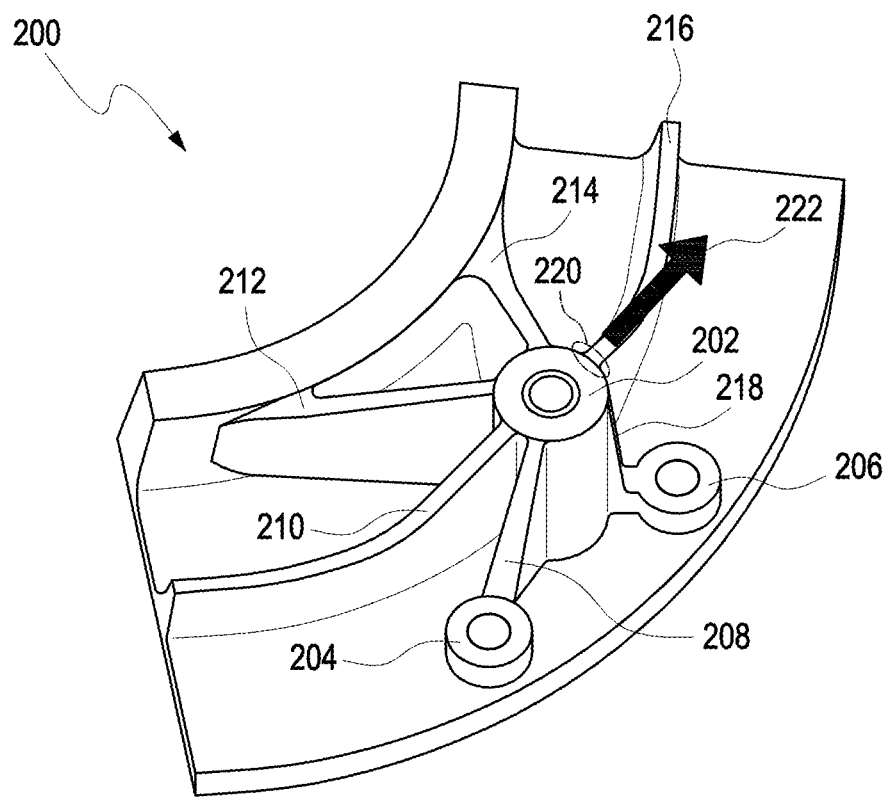
FIG. 1a shows an example of a component as is known from the prior art, in a schematic representation.
FIG. 1b shows an example of a component as is known from the prior art, in a schematic representation.
Figure 1:
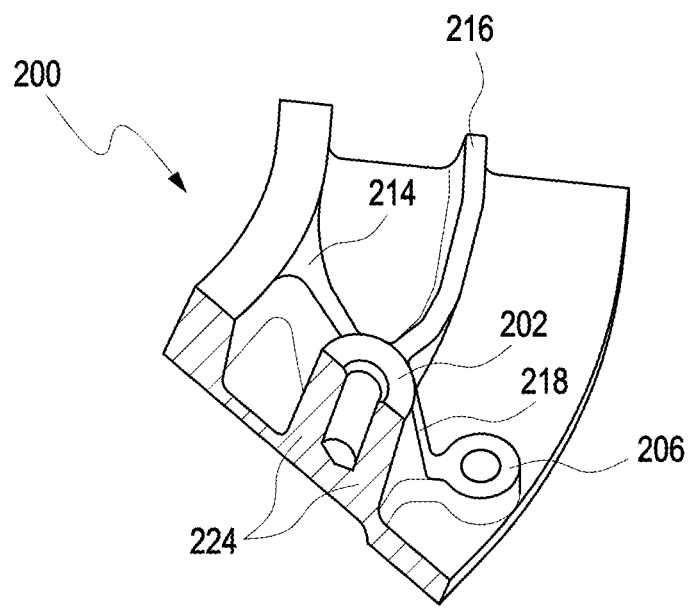

The component 200 schematically shown in FIG. 1a has a first slug 202 as well as two further slugs 204, 206, in which each slug 202, 204, 206 is provided for mounting a screw. FIG. 1b shows a part of the component 200 along a section through the first slug 202.

As shown in both FIGS. 1a and 1b, the first slug 202 is supported by several ribs 208, 210, 212, 214, 216, 218 on a wall of the component 200, in which the slug 202 protrudes starting from the wall. In this case, the ribs 208, 210, 212, 214, 216, 218 are arranged about the slugs 202 in the shape of a star. Furthermore, FIG. 1a shows a peak stress for the slug 202 by means of an ellipse 220 and a mechanical load of the slug 202 by means of an arrow 222. FIG. 1b shows additional material buildup 224 which results for the slug 202 due to the ribs 208, 210, 212, 214, 216, 218.

Very thick ribs 208, 210, 212, 214, 216, 218 are frequently required with the prior art due to the high mechanical loads. However, if a mechanical load direction is not constant, it is absolutely necessary to arrange ribs 208, 210, 212, 214, 216, 218 in several load directions. In this case, particularly in the event that the component 200 is used in a vehicle, it should be considered that load directions are seldom constant, which is why the ribs 208, 210, 212, 214, 216, 218 cannot always be optimally utilized. The first slug 202 or threaded slug is connected to the component 200 by means of the ribs 208, 210, 212, 214, 216, 218. However, despite the numerous ribs 208, 210, 212, 214, 216, 218 used, impermissibly high peak stresses can result at a start of a respective rib 208, 210, 212, 214, 216, 218. In addition, the star-shaped arrangement of the ribs 208, 210, 212, 214, 216, 218 with the component 200 which is formed, for example, as a cast component, can cause unfavorable material buildup 224.

Figure 2:
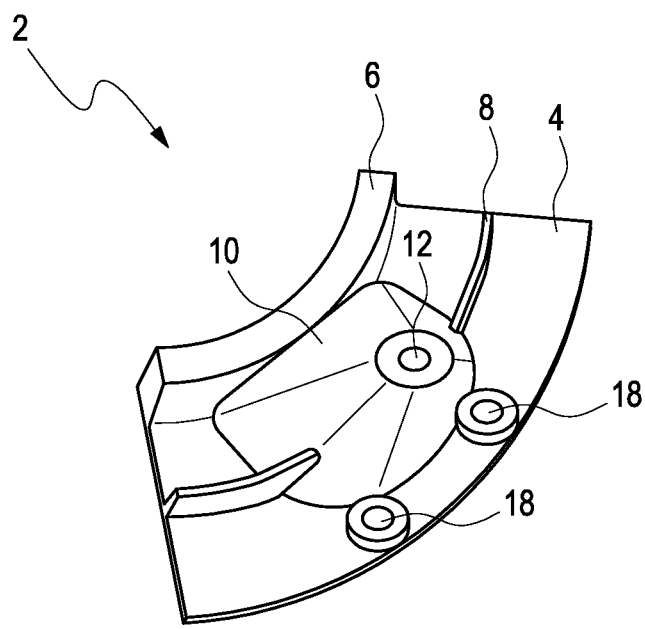
FIG. 2a shows a view of a first embodiment of the component according to the invention, in a schematic representation.
Figure 2:
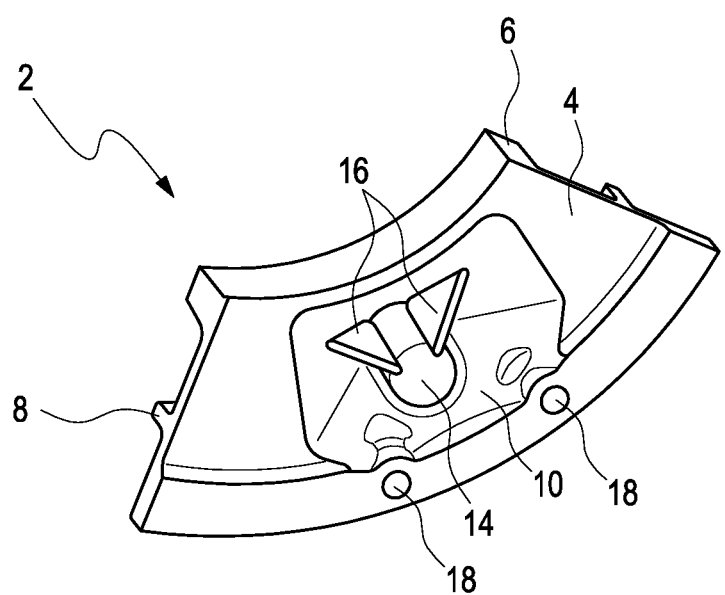
Figure 2:
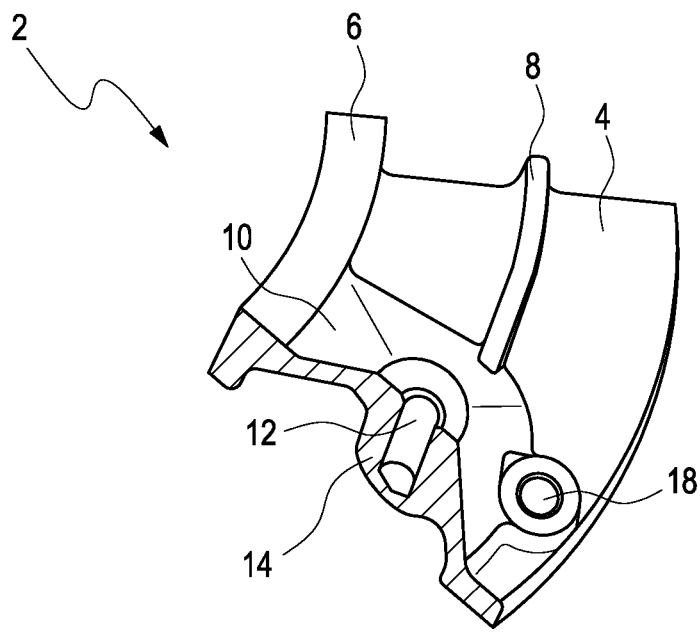

The first embodiment of the component 2 or of a corresponding workpiece or semi-finished part according to the invention is shown schematically from different perspectives in FIGS. 2a, 2b, and 2c. In this case, the component 2 has a support 4, which is formed as a part of a circular ring in this case with an internal and an external diameter. This support 4 is connected to a pipe section 6 of the component 2. A threshold 8 is also arranged on a surface of the support 4 in this case.

Furthermore, a flat region or a plane is defined, which is situated or arranged in the support 4, particularly between an upper side of the support 4, which is shown in FIGS. 2a and 2c, and the lower side of the support 4, which is shown in FIG. 2b. A cone-shaped, funnel-shaped, and/or tent-shaped support cover 10 of the support 4 protrudes starting from the flat region in the support 4 and thus from a wall of the component 2 or a corresponding workpiece, in which one end of the support cover 10, said end facing away from the support 4 or from the flat region, is equipped with a recess 12 for mounting a securing element.

In this case, the support cover 10 is shown from above in FIG. 2a and from below in FIG. 2b. FIG. 2a shows an outer wall and FIG. 2b shows an inner wall of the support cover 10. In this case, FIG. 2b particularly shows that a body of a slug 14 forms a wall of the recess 12. To this end, reference is also made to FIG. 2c which shows the component 2 along a section through the support cover 10, the recess 12, and the slug 14.

Depending on the definition, the support cover 10, which at least partly surrounds and/or encloses the slug 14, is a protrusion of the support 4 and is thus a part or an extension of the support 4, which protrudes or extends from the flat region in the support 4. The support cover 10 in this case is at least partly, particularly for the most part, cone-shaped or funnel-shaped and/or tent-shaped and is limited, on one side, by the surface of the support 4 and, on the other side, by the pipe section 6. In this case, the support cover 10 replaces the ribs 208, 210, 212, 214, 216, 218 necessary in the prior art for stabilizing the slug 14 with the recess 12 for mounting the securing element.

As shown in FIG. 2b, the inner wall of the support cover 10, which is facing away from the outer wall of the support cover 10 shown in FIG. 2a, surrounds or encloses a body of the slug 14 such that the slug 14 is arranged within the support cover 10. In this case, the end of the support cover 10, which is a facing away from the support 4 or from the flat region, and one end of the slug 14, which forms a wall for the recess 12, are connected to one another, in which it is possible, depending on the definition, that the support cover 10 and the slug 14 and/or the body of the slug 14 form or have a common end. Starting from the common end or the common ends, the inner side of the support cover 10 and the slug 14 and/or the body thereof are separate from one another and/or spaced apart from one another in the direction of the flat region of the support 4.

FIG. 2b also shows that, in a potential embodiment of the component 2, the body of the slug 14 is connected to the inner wall of the support cover 10 via additional inner ribs 16. In addition, FIGS. 2a, 2b, 2c show two further holes 18, which are incorporated into the support 4 of the component 2, independently of the design of the component 2 according to the invention.

The second embodiment of the component 30 according to the invention and/or a corresponding workpiece according to the invention is shown in FIG. 3 in a sectional view. In this case, this component 30 comprises a planar, in this case flat, body and/or support 32, which is simultaneously defined and/or provided as a part of a wall of the component 30. In this case, a plane and/or a flat region 34, which is situated in the support 32, is defined, arranged therein, and/or located therein.

A cone-shaped or funnel-shaped and/or tent-shaped support cover 36, which is formed as an extension and/or protrusion of the support 32 and thus as a part of the support 32, protrudes from the flat region 34 of the support 32. In this case, the support 32 and the support cover 36 have approximately the same wall thickness, apart from design and/or geometric deviations. A common end 38 of the cone-shaped, funnel-shaped, and/or tent-shaped support cover 36 and of the slug 42 is facing away from the support 32 as well as the flat region 34 and encloses an opening of a rotationally symmetrical recess 40, which is formed for mounting a rotationally symmetrical securing element, for example a screw. The support cover 36 extends starting from the flat region 34 and/or the support 32 of the component 30 in the direction of the end 38. In this case, the slug 42 is an extension of the support cover 36 depending on the definition, because the slug 42 and the support cover 36 are connected to one another at the end 38. The recess 40 is enclosed by a body of the slug 42, which forms a wall of the recess 40. An inner side of the support cover 36 surrounds and/or encloses a cone-shaped region and/or a cone-shaped volume, in which the slug 42 is arranged, in which an inner side of the support cover 36 and the slug 42 are spaced apart from one another in the cone-shaped region. In one embodiment, the support 32, the support cover 36, and the slug 38 are formed as a one-piece contiguous component 30 or workpiece, which is produced by means of a casting process or from a forged part. A further component, which is not shown here, can be attached to component 30 via the securing element, which can be attached to component 30.

REFERENCE NUMERALS

2 Component
4 Support
6 Pipe section
8 Rail
10 Support cover
12 Recess
14 Slug
16 Ribs
18 Hole
30 Component
32 Support
34 Flat region
36 Support cover
38 End
40 Recess
42 Slug
200 Component
202, 204, 206 Slug
208, 210, 212 Rib
214, 216, 218 Rib
220 Ellipse
222 Arrow

The invention claimed is:

1. A component comprising:
a support, for which a flat region is defined, wherein the support has a support cover which at least partly has the shape of a cone, a funnel, or a tent and which protrudes from the flat region, and one end of the at least partly cone-, funnel-, or tent-shaped support cover, facing away from the flat region of the support, is equipped with a recess for mounting a securing element to be secured to the component; and
a slug, which is arranged on the end of the at least partly cone-shaped, funnel-shaped, or tent-shaped support cover and forms a wall for the recess, a recess in a body of the slug has an internal thread that corresponds to the securing element, and a base of the slug is aligned with the flat region.

2. The component according to claim 1, wherein the at least partly cone-shaped, funnel-shaped, or tent-shaped support cover encloses an at least partly cone-shaped, funnel-shaped, or tent-shaped region.

3. The component according to claim 2, wherein the securing element is to be arranged in the recess, wherein an opening of the recess is arranged on the end of the at least partly cone-shaped, funnel-shaped, or tent-shaped support cover.

4. The component according to claim 2, wherein the recess is formed for attaching the securing element formed as a screw.

5. The component according to claim 2, wherein the component is formed as a cast component, forged component, plastic component, or cold-extruded component.

6. The component according to claim 2, wherein the component is formed as a part of a motor vehicle.

7. The component according to claim 1, wherein the securing element is to be arranged in the recess, and an opening of the recess is arranged on the end of the at least partly cone-shaped, funnel-shaped, or tent-shaped support cover.

8. The component according to claim 7, wherein the at least partly cone-shaped, funnel-shaped, or tent-shaped support cover encloses the slug at least partly.

9. The component according to claim 8, wherein the recess is formed for attaching the securing element formed as a screw.

10. The component according to claim 8, wherein the component is formed as a cast component, forged component, plastic component, or cold-extruded component.

11. The component according to claim 8, wherein the component is formed as a part of a motor vehicle.

12. The component according to claim 7, wherein the recess is formed for attaching the securing element formed as a screw.

13. The component according to claim 7, wherein the component is formed as a cast component, forged component, plastic component, or cold-extruded component.

14. The component according to claim 7, wherein the component is formed as a part of a motor vehicle.

15. The component according to claim 1, wherein the recess is formed for attaching the securing element formed as a screw.

16. The component according to claim 15, wherein the component is formed as a cast component, forged component, plastic component, or cold-extruded component.

17. The component according to claim 15, wherein the component is formed as a part of a motor vehicle.

18. The component according to claim 1, wherein the component is formed as a cast component, forged component, plastic component, or cold-extruded component.

19. The component according to claim 18, wherein the component is formed as a part of a motor vehicle.

20. The component according to claim 1, wherein the component is formed as a part of a motor vehicle.

* * * * *